United States Patent
Gail et al.

(10) Patent No.: US 10,564,318 B2
(45) Date of Patent: Feb. 18, 2020

(54) CODED WEATHER DATA

(71) Applicant: Global Weather Corporation, Boulder, CO (US)

(72) Inventors: William B Gail, Boulder, CO (US); William Myers, Boulder, CO (US)

(73) Assignee: Global Weather Corporation, Boulder, CO (US)

( * ) Notice: Subject to any disclaimer, the term of this patent is extended or adjusted under 35 U.S.C. 154(b) by 344 days.

(21) Appl. No.: 15/619,751

(22) Filed: Jun. 12, 2017

(65) Prior Publication Data

US 2017/0357030 A1 Dec. 14, 2017

Related U.S. Application Data

(60) Provisional application No. 62/349,742, filed on Jun. 14, 2016.

(51) Int. Cl.
*G01W 1/10* (2006.01)
*G01W 1/02* (2006.01)
*G06Q 10/00* (2012.01)
*G06Q 10/04* (2012.01)

(52) U.S. Cl.
CPC ............... *G01W 1/10* (2013.01); *G01W 1/02* (2013.01); *G06Q 10/00* (2013.01); *G06Q 10/04* (2013.01)

(58) Field of Classification Search
CPC .......... G01W 1/02; G01W 1/10; G06Q 10/00; G06Q 10/04
USPC .......................................................... 702/3
See application file for complete search history.

(56) References Cited

U.S. PATENT DOCUMENTS

| 7,184,891 B1* | 2/2007 | Kuleszynski | G01W 1/10 702/3 |
| 7,379,817 B1* | 5/2008 | Tyson | G01W 1/06 702/3 |
| 2011/0029243 A1* | 2/2011 | Gallagher | G01K 7/42 702/3 |

* cited by examiner

*Primary Examiner* — John H Le
(74) *Attorney, Agent, or Firm* — The Ollila Law Group LLC

(57) ABSTRACT

A weather data system (100) with coded weather data is provided. The weather data system (100) includes an observation location (110), the observation location (110) comprising a plurality of data sources (112) configured to provide observation data (212). The observation location (110) is configured to at least one of code the observation data (212) into a coded observation data (212') and provide the observation data (212) to a data aggregator (114) configured to code the observation data (212) into the coded observation data (212').

19 Claims, 6 Drawing Sheets

CODED WEATHER DATA

CROSS REFERENCE TO RELATED APPLICATIONS

This application claims priority to U.S. Application No. 62/349,742, filed Jun. 14, 2016. The content of the above application is incorporated by reference in its entirety.

TECHNICAL FIELD

The embodiments described below relate to weather data and, more particularly, to coded weather data.

BACKGROUND

Observations from weather stations can be used in various ways to improve weather forecasts. With one method commonly called post-processing, observations are used for any or all of the following steps: a) statistically correct individual numerical weather prediction (NWP) forecast models, b) guide consensus combinations of those models for generating an improved forecast, and c) ensure the forecast matches the observation for the current time at the observation location.

In general, the forecasts are computed in a centralized forecasting location, distant from where the observations are made. The observations are transmitted electronically to the forecasting location, generally in a form such that those observations are quantitatively identifiable by someone at the forecasting location. In some cases, for privacy purposes it is undesirable to transmit the observations in identifiable form to the forecasting location. Normally, this would mean that no forecast can be provided for which the observations are used in its computation, since any encryption would normally require decryption at the forecasting location. Accordingly, there is a need for coded weather data.

SUMMARY

A weather data system with coded weather data is provided. According to an embodiment, the weather data system comprises an observation location, the observation location comprising a plurality of data sources configured to provide observation data. The observation location is configured to one of code the observation data into a coded observation data and provide the observation data to a data aggregator configured to code the observation data into the coded observation data.

A method of forecasting with coded weather data is provided. According to an embodiment, the method comprises determining a model adjustment of a forecast model, wherein the model adjustment includes an actual model adjustment and a code. The method uses the forecast model to determine a forecast based on coded observation data.

A method of forecasting with coded weather data is provided. According to an embodiment, the method comprises obtaining observation data from an observation location, including an adjustment in one or more values in the observation data to provide coded observation data. The method also comprises receiving a coded forecast data determined based on the coded observation data and determining an actual forecast by removing the adjustment from the coded forecast data.

Aspects

According to an aspect, a weather data system (100) with coded weather data comprises an observation location (110), the observation location (110) comprising a plurality of data sources (112) configured to provide observation data (212). The observation location (110) is configured to at least one of code the observation data (212) into a coded observation data (212') and provide the observation data (212) to a data aggregator (114) configured to code the observation data (212) into the coded observation data (212').

Preferably, the weather data system (100) further comprises the data aggregator (114) communicatively coupled to the plurality of data sources (112).

Preferably, the weather data system (100) further comprises a forecasting location (120) communicatively coupled to the observation location (110) and configured to receive the coded observation data (212').

Preferably, the forecasting location (120) is communicatively coupled to the observation location (110) via the data aggregator (114).

Preferably, the observation data (212) comprises a label array (212a) and an observation data array (212b), the observation data array (212b) including observation values (X1).

Preferably, the observation data (212) is coded by introducing an adjustment to at least one of the observation values (X1) to obtain the coded observation data (212').

Preferably, introducing the adjustment to at least one of the observation values (X1) comprises combining an adjustment value (Q) with the at least one of the observation values (X1) to obtain at least one coded observation value.

Preferably, the at least one of the observation location (110) and the data aggregator (114) is further configured to receive a coded forecast and decode the coded forecast to obtain an actual forecast.

Preferably, the coded forecast is determined based on the coded observational data (212').

Preferably, the coded forecast is comprised of a coded forecast value calculated using forecast value (X2) and a model adjustment (B1).

Preferably, the model adjustment (B1) is determined based on an actual model adjustment (B0) combined with an adjustment value (Q) used to code the observation data (212) into the coded observation data (212').

Preferably, the plurality of data sources (112) comprises at least one sensor, the at least one sensor being at least one of a radar, a temperature sensor, a barometer, a power meter, and wind sensor.

Preferably, the weather data system (100) comprises at least one additional observation location (110') comprising a plurality of additional observation data sources (112').

A method of forecasting with coded weather data comprises determining a model adjustment of a forecast model, wherein the model adjustment includes an actual model adjustment and a code and using the forecast model to determine a forecast based on coded observation data including the code.

Preferably, determining the model adjustment of the forecast model is comprised of determining a model adjustment based on a difference between a forecast value and an observational value.

Preferably, the model adjustment is further based on an adjustment value (Q).

A method of forecasting with coded weather data comprises obtaining observation data at an observation location, including an adjustment in one or more values in the observation data to provide coded observation data. The method also comprises receiving a coded forecast data determined based on the coded observation data, and determining an actual forecast by removing the adjustment from the coded forecast data.

Preferably, the method further comprises transmitting the coded observation to a forecast location.

Preferably, the method further comprises using a forecast model to determine the coded forecast data based on the coded observation data.

Preferably, the method further comprises transmitting the coded forecast data to the observation location.

BRIEF DESCRIPTION OF THE DRAWINGS

The same reference number represents the same element on all drawings. It should be understood that the drawings are not necessarily to scale.

DETAILED DESCRIPTION

FIGS. 1-6 and the following description depict specific examples to teach those skilled in the art how to make and use the best mode of embodiments of coded weather data. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the coded weather data. As a result, the embodiments described below are not limited to the specific examples described below.

This invention describes a means for transforming the observations into a coded form than can be transmitted and used for computing the forecast while ensuring the actual observation values cannot be ascertained at the forecasting location. To achieve this, the invention takes advantage of the fact that the forecast computation is insensitive to certain characteristics of the observations. In one embodiment, for example, the forecast computation is insensitive to an arithmetic offset in the observation value. Thus an arithmetic offset can be inserted at the observation location, creating a new coded data set from which it is not possible to know the actual observation value while still allowing the coded data to be used in generating the forecast. The reason this is possible is that the forecast computation assumes there is some such offset inherent to the difference between the NWP value and the corresponding (same time and location) observation value. Indeed, one step in the forecast computation involves solving for that offset.

Figure 1:
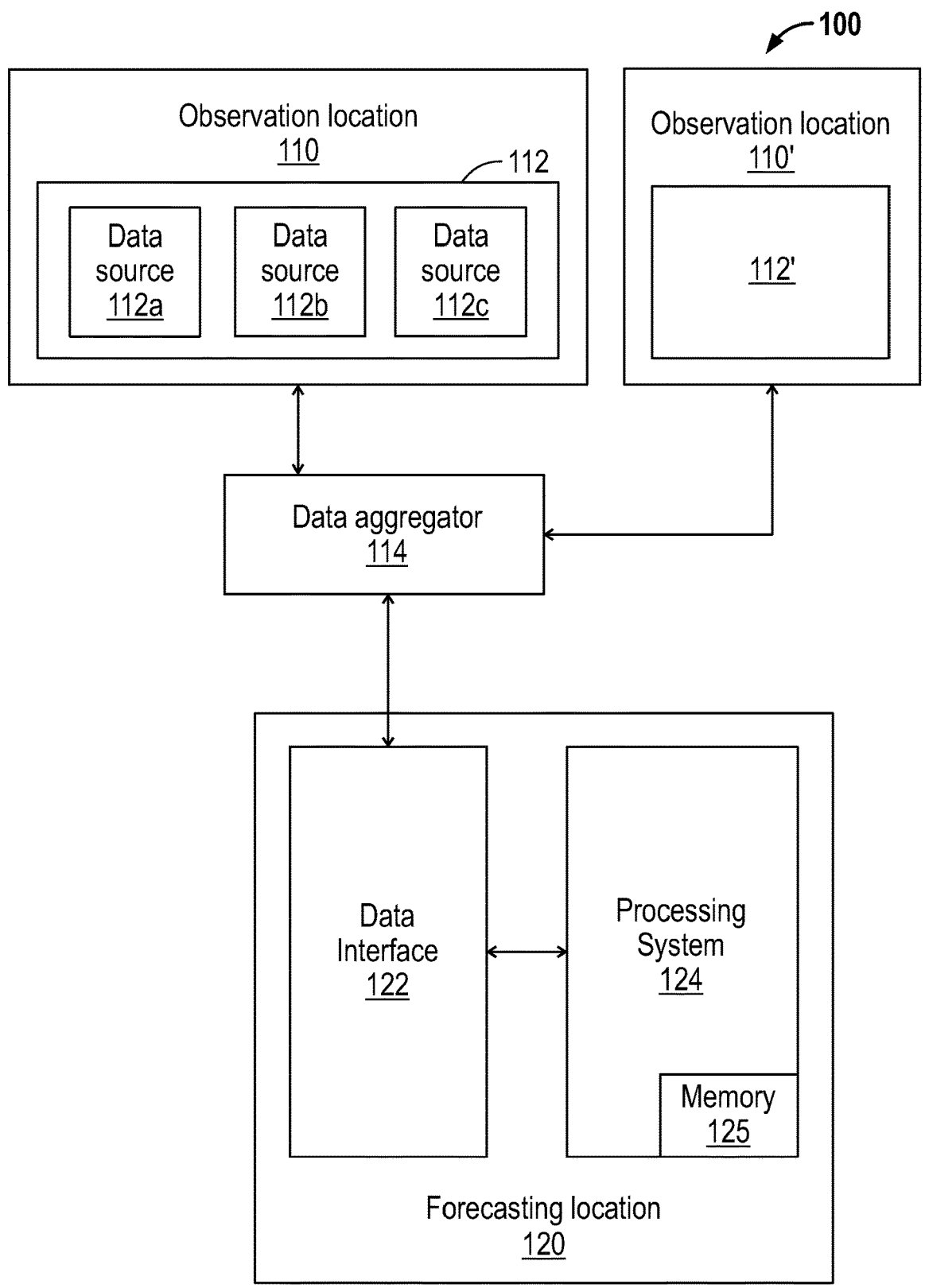
FIG. 1 shows a weather data system 100 with coded weather data according to an embodiment.

FIG. 1 shows a weather data system 100 with coded weather data according to an embodiment. The coded weather data may comprise weather observation data or weather forecast data. The weather data may comprise a variety of weather characteristics such as, for example, temperature, wind speed, wind direction, dew point, barometric pressure, humidity, UV level, visibility, cloud coverage, etc., or equivalent proxy information related to weather characteristics such as a power output from a system, such as a wind or solar farm. As shown in FIG. 1, the weather data system 100 includes an observation location 110 that is communicatively coupled to a forecasting location 120 via a network, which may be any suitable network, such as a local or wide area network, internet using any suitable mode of communication such as wired, wireless, satellite, optical, and employ any suitable network protocols, communication schemes, etc.

As shown in FIG. 1, the observation location 110 is comprised of a plurality of data sources 112 communicatively coupled to a data aggregator 114. Also shown is another observation location 110' that also includes a plurality of data sources 112' that are also communicatively coupled to the data aggregator 114, although more or fewer observation locations may be employed. The plurality of data sources 112 include a first through third data source 112a-112c, although more or fewer data sources may be employed in alternative embodiments. The data sources 112a-112c may comprise sensors such as radars, temperature sensors, barometers, wind sensors, power meters, etc. The observation location 110 can aggregate the observation data from the plurality of data sources 112 and provide the aggregated observation data to the data aggregator 114. The observation location 110 can be any suitable location where observation data is gathered and can, for example, be in a jurisdiction that prohibits exporting weather observation data. The data aggregator 114 may or may not be located at one of the observation locations 110, 110' and can aggregate observation data provided by the observation locations 110, 110'.

Referring to the observation location 110 according to an embodiment, the forecasting location 120 can receive observation data from the observation location 110 via the data aggregator 114. The forecasting location 120 can also receive weather data from other observation data sources. These other sensors may be the same type of sensors used by the observation location 110 or may be different. The other data sources may alternatively or additionally comprise a database of sensors. One exemplary database is the "Meteorological Assimilation Data Ingest System" (MADIS) that is operated by the National Oceanic and Atmospheric Administration. According to an embodiment, one of the data sources may also comprise a geographical data source that provides geographical data such as climate data, topographical data, etc.

According to an embodiment, the weather data can be received by a data interface 122. The data interface 122 can receive the observation data from the observation location 110 and perform any necessary processing, digitizing, etc., in order to be usable by the forecasting system's processing system 124. The processing system 124 can comprise a general purpose computer, a micro-processing system, a logic circuit, a digital signal processor, or some other general purpose or customized processing device. The processing system 124 can be distributed among multiple processing devices. The processing system 124 can include any manner of integral or independent electronic storage medium, such as the internal memory 125. It should be appreciated that the processing system 124 may include many other components that are omitted from the drawings and discussion for the purpose of simplifying the description.

The particular components of the forecasting system 100 have been simplified for brevity of the description and many components have been omitted altogether. Those skilled in the art will readily appreciate that additional components may be provided without departing from the scope of the claims that follow.

Figure 2:
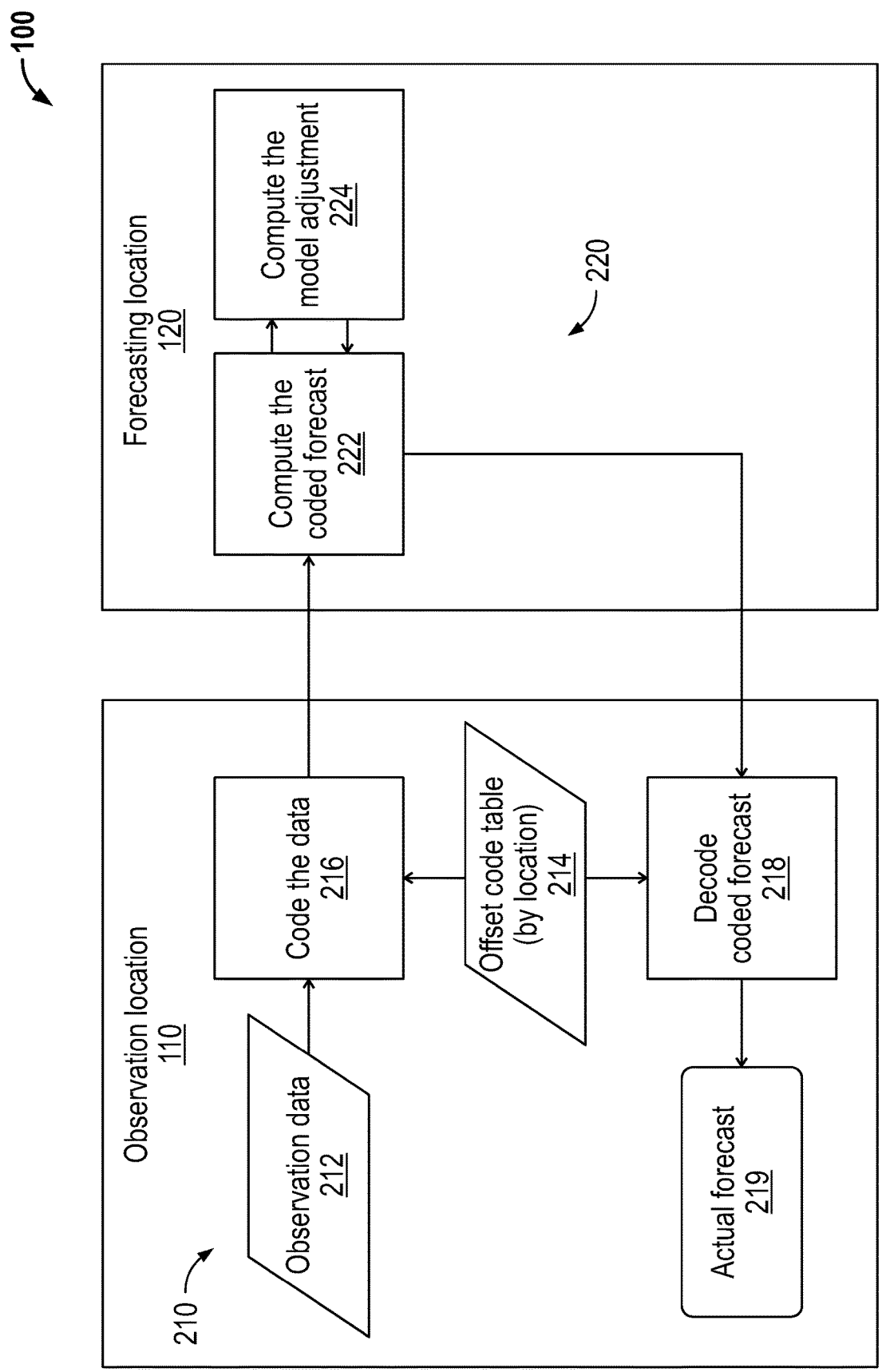
FIG. 2 shows block diagram of the weather data system 100 with the coded weather data.

FIG. 2 shows a block diagram of the weather data system 100 with the coded weather data. As shown in FIG. 2, the weather data system 100 includes block representations of the observation location 110 and forecasting location 120 described in the foregoing with reference to FIG. 1. The observation location 110 performs coding and decoding data operations 210. As shown in FIG. 2, the data operations 210 is comprised of observation data 212, an adjustment code table 214, a process step that codes the observation data 216, a process step that decodes a coded forecast 218, and an actual forecast data 219. Also as shown in FIG. 2, the forecasting location 120 performs forecasting operations 220. The forecasting operations 220 is comprised of processing steps that compute the coded forecast 222 and compute the model adjustment 224.

The observation data 212 may be obtained by the data aggregator 114 from the data sources 112a-112c, although any suitable data source may be employed. For example, the observation data 212 may be obtained from other data sources. In alternative embodiments where, for example, the data aggregator 114 is not employed, the observation data 212 may be obtained from the observation location 110. The observation location 110 and/or the data aggregator 114 can code the observation data 216, which is described in more detail in the following.

Figure 3:
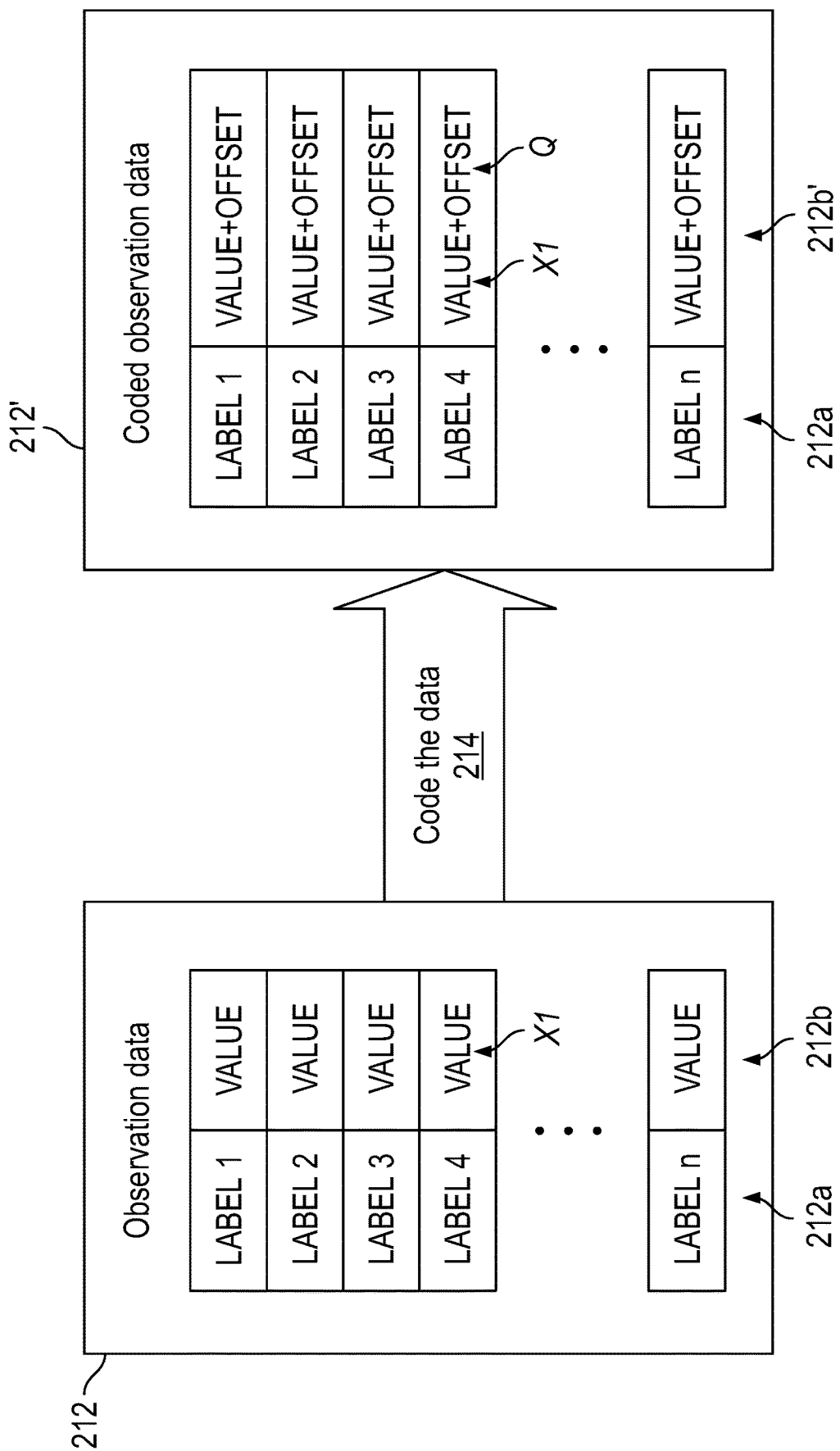
FIG. 3 shows a more detailed view of the observation data 212 and a coded observation data 212'.

FIG. 3 shows a more detailed view of the observation data 212 and a coded observation data 212'. The observation data 212 and the coded observation data 212' include the same label array 212a. However, the observation data 212 includes an observation data array 212b. The observation data 212 is converted into the coded observation data 212' by introducing adjustments to each observation value X1 in the observation data array 212b. One possible approach, using additive offsets, is as follows:

$$C = X1 + Q, \qquad (1)$$

where:
  C is a coded observation value;
  Q is an additive offset value; and
  X1 is an observation value.

More specifically, an adjustment value Q is added to an observation value X1 to result in a coded observation value C. Due to the adjustment value Q being added to the observation value X1, the observation value X1 cannot be ascertained by an organization at the forecasting location 120. The technique can be implemented by software within an organization at the observation location 110 and/or data aggregator 114 that transmits a coded observation value C=X1+Q, rather than the observation value X1. The adjustment value Q can be different for each observation location, but may be a constant value over time for a given location.

The adjustment value Q is obtained from the adjustment code table 214. The adjustment code table 214 may be any suitable table, such as a hash, array, or other object that can contain a plurality of the adjustment values Q. The adjustment code table 214 may also include cross references to corresponding labels in the label array 212a. For example, a first adjustment value Q in the adjustment code table 214 may be cross referenced to the first label in the label array 212a. Accordingly, coding the observation data 212 may comprise looking up via the cross references, a label in the label array 212a and an adjustment value Q that corresponds to the observation value X1 to be coded. Each look up of the adjustment value Q and the coding of the individual observation values X1 can be performed iteratively until all of the observation values X1 are transformed to the coded observation values C. Each adjustment value Q in the observation data 212 may be different for each of the corresponding observation value X1. In an alternative embodiment, the adjustment value Q can be the same for all of the labels in the label array 212a.

As a result, the observation location 110 and/or data aggregator 114 can provide the coded observation data 212', which prevents the forecasting location 120 from ascertaining the observation value X1. However, the forecasting location 120 can still perform forecasting using the coded observation data 212', as is described in more detail in the following.

Figure 4:
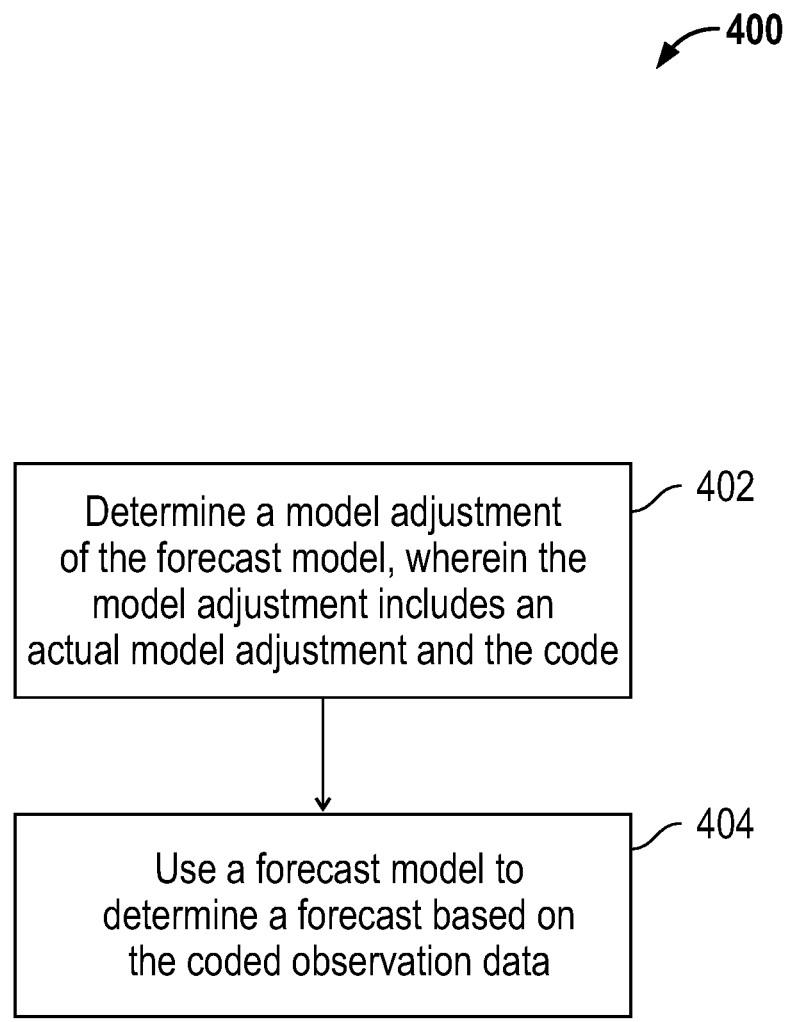
FIG. 4 shows a method 400 of forecasting with coded weather data.

FIG. 4 shows a method 400 of forecasting with coded weather data. As shown in FIG. 4, the method 400 determines the model adjustment of the forecast model, where the model adjustment includes the actual model adjustment B0 and the code included with the coded observation data in step 402. An example of a commonly used adjustment is a bias correction. One standard function of the forecast model may be to compute a model adjustment at each location and for each forecast lead time and for each label in the label array. For example, with reference to the embodiment where the observation data 212 includes observation values X1 in their original non-coded form, the actual model adjustment may be a difference between the observation value X1 and a forecast value X2 (in other words, a model bias), which is illustrated by the following relationship:

$$B0 = \langle X1 - X2 \rangle, \qquad (2)$$

where:
  B0 is the actual model adjustment;
  X1 is the observation value; and
  X2 is a forecast value that does not include any adjustment.

The brackets "< >" imply a time average over the data. That is, the difference can be computed and accumulated over some period of time (for example 60 days), to exhibit the mean result of the actual model adjustment B0. The actual model adjustment B0 is the adjustment that should be applied to the forecasting model to improve the forecast X2, based on statistical knowledge of how well it matches the observation X1. The actual forecast is F=X2−B0, ensuring that it matches more closely the observation values X1 at that location than if a forecast F=X2 was provided without this bias correction.

With reference to the coded observation data 212', which includes the adjustment values Q, the model adjustment can be determined in step 402 to be:

$$B1 = B0 + Q, \qquad (3)$$

where:
  B1 is the model adjustment that includes the adjustment value Q; and
  B0 is the actual model adjustment.

The method 400 uses a forecast model to determine a forecast based on the coded observation data in step 404. For example, using the model adjustment B1, the coded forecast can be calculated as follows:

$$F' = X2 - B1 = X2 - (B0 + Q), \qquad (4)$$

where:
  F' is a coded forecast value;
  X2 is a forecast value that does not include any model adjustment;

B1 is a model adjustment that includes the code (e.g., adjustment value Q);

B0 is an actual model adjustment; and

Q is the adjustment value that is added to the observation value X1.

Other standard functions of post-processing, such as consensus forecast, can function properly using this technique. The calculated coded forecast data and its decoding into the actual forecast data 219 is described in more detail in the following with reference to FIG. 5.

Figure 5:
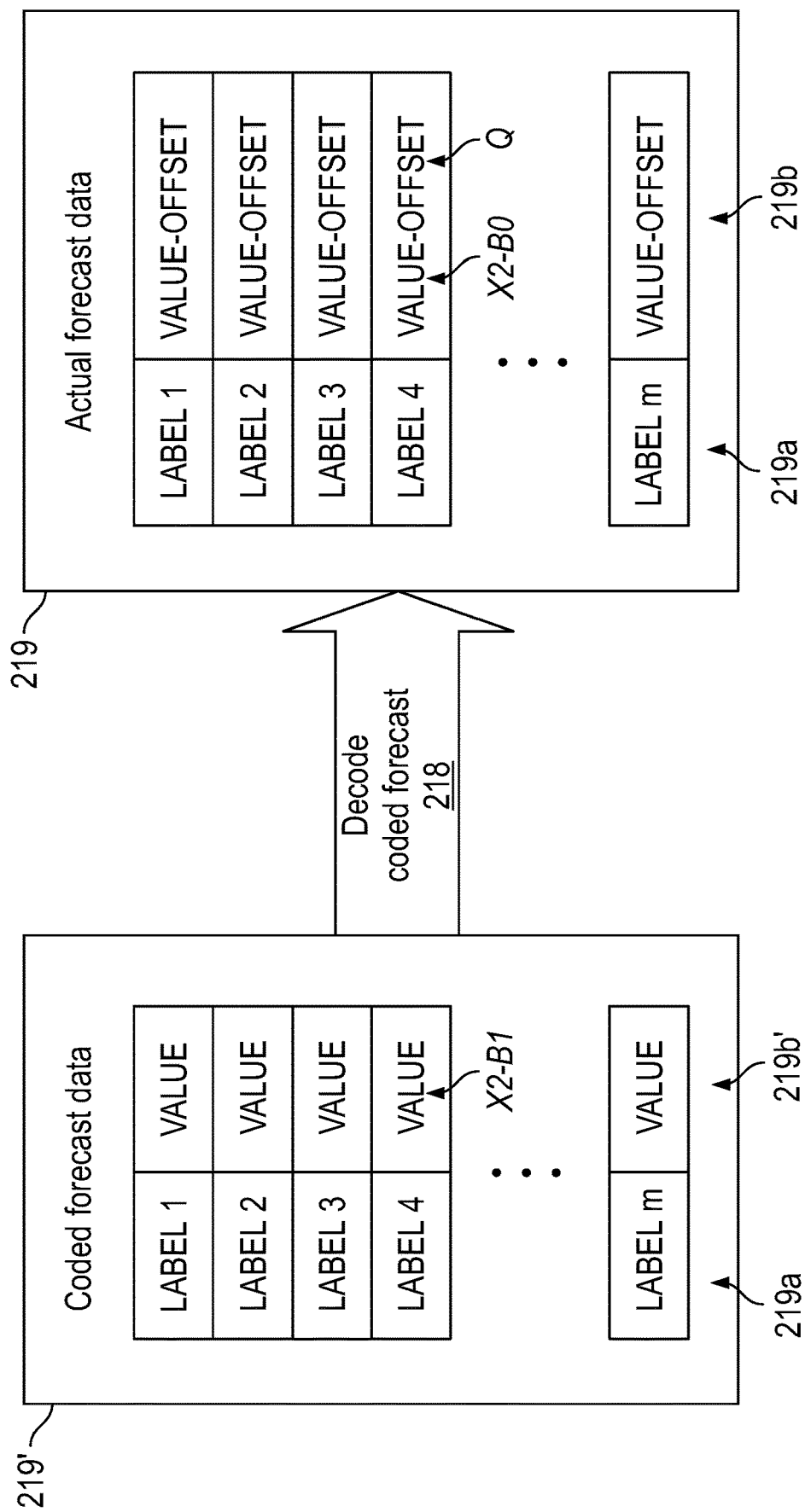
FIG. 5 shows a more detailed view of the coded forecast data 219' and the actual (decoded) forecast data 219.

FIG. 5 shows a detailed view of a coded forecast data 219' and the actual (decoded) forecast data 219. Also shown is the processing step that decodes the coded forecast data 218. As shown in FIG. 5, the coded forecast data 219' and the actual forecast data 219 includes a label array 219a, which may be the same as the labels in the label array 212a of the observation data 212. The coded forecast data 219' also includes a coded forecast array 219b', which contains coded forecast values, such as, for example, the coded forecast value F' discussed above. As shown, the each coded forecast value F' in the coded forecast array 219b' is comprised of a difference between a forecast value X2' (which includes the actual model adjustment B0) and a model adjustment B1 that includes the adjustment value Q.

An actual forecast value can therefore be determined using the following relationships:

$$F=F'-Q=X2-B0, \quad (5)$$

where:

F is an actual forecast value that can be used at the observation location 110; and F' is the coded forecast value.

Exemplary detailed steps of obtaining and coding the observation data 212 and decoding the coded forecast data 219' into the actual forecast data 219 are described in more detail in the following with reference to FIG. 6.

Figure 6:
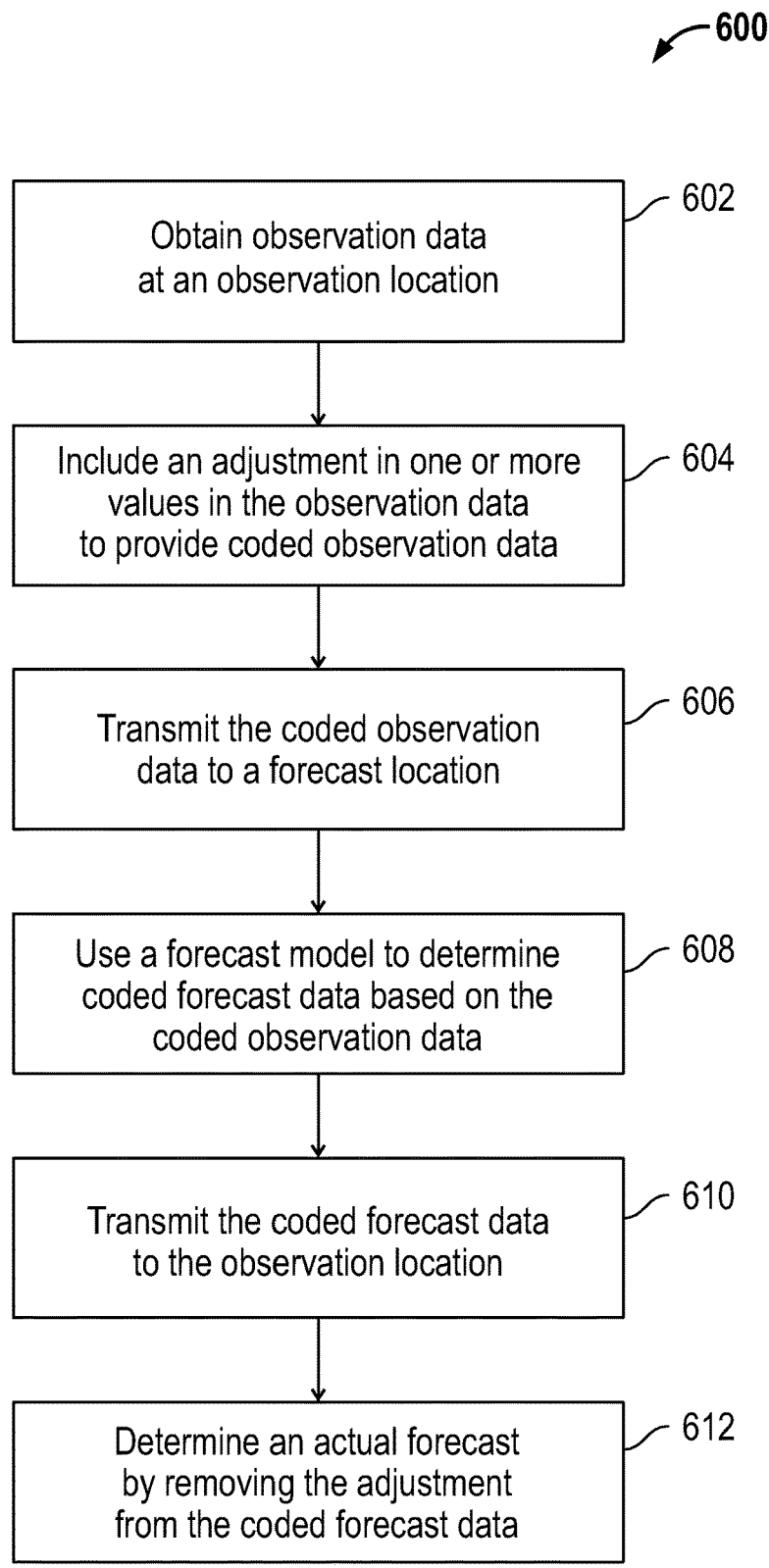
FIG. 6 shows a method 600 of forecasting with coded weather data.

FIG. 6 shows a method 600 of forecasting with coded weather data. As shown in FIG. 6, the method 600 begins by obtaining observation data at an observation location in step 602. The observation data can be obtained by the data sources 112a-112c described with reference to FIG. 1. The observation data can be provided by the data sources 212a-212c to the data aggregator 114. The observation data can be the observation data 212 shown in FIG. 3, although any suitable observation data may be employed.

In step 604, the method 600 includes an adjustment by, for example, adding an offset to one or more values in the observation data to provide coded observation data. With reference to the embodiment shown in FIG. 1, the data aggregator 114 can code the observation data provided by the observation location 110. Alternatively, the observation location 110 can code the observation data. In this alternative embodiment, the data aggregator 114 could simply aggregate the coded observation data with other observation locations, such as the observation location 110' shown in FIG. 1. The coded observation data may be the coded observation data 212' shown in FIG. 3.

In step 606, the method 600 transmits the coded observation data to a forecast location. Any suitable means of transmitting the data may be employed. For example, the coded observation data may be transmitted by a network, which may be any suitable network, such as a local or wide area network, internet using any suitable mode of communication such as wired, wireless, satellite, optical, and employ any suitable network protocols, communication schemes, etc.

The method 600 uses a forecast model to determine coded forecast data based on the coded observation data in step 608. Due to the coded observation being employed, the coded forecast data includes the adjustment value Q that is part of the coded observation data. The coded forecast data may be the coded forecast data 219' described in the foregoing with reference to FIG. 5.

In step 610, the method 600 transmits the coded forecast data to the observation location. Any suitable means of transmitting the data may be employed. For example, the coded forecast data may be transmitted by the same or different network that transmitted the coded observation data to the forecasting location.

The method 600 determines an actual forecast by removing the adjustment by, for example, subtracting the offset from the forecast in step 612. For example, an organization at the observation location 110 can obtain an adjustment value Q from the adjustment code table 214 and subtract the adjustment value Q from a corresponding coded forecast value F' in the coded forecast data 219'. By subtracting the adjustment value Q from the corresponding coded forecast value F' in the coded forecast data 219', the actual forecast value F may be obtained.

The foregoing provides coded weather data. The coded weather data can be the coded observation data 212' or the coded forecast data 219'. Due to the coded weather data, the privacy of an organization at the observation location is inherently protected, as the actual model adjustment B0 cannot be computed by an organization at the forecasting location 120 without the observation value X1. Because only a coded observation value C=X1+Q is provided to the organization at the forecasting location rather than the observation value X1, it is not possible for the organization at the forecasting location to know which portion of the computed model adjustment B1=B0+Q is actual real model adjustment B0 and which portion is the inserted adjustment value Q. The organization at the forecasting location can know the total value B1=B0+Q, but it cannot determine either the actual or real model adjustment B0 or the adjustment value Q. Thus the coded data value C=X1+Q provided from the organization at the observation location cannot be used by the organization at the forecasting location to know either the observation value X1 or the correct forecast value F. The privacy and security of the observation data 212, and any forecasts that use that data, such as the actual forecast data 219, is protected.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other coded weather data and not just to the embodiments described above and shown in the accompanying figures. Accordingly, the scope of the embodiments described above should be determined from the following claims.

We claim:

1. A weather data system (100) with coded weather data, the weather data system (100) comprising:
   an observation location (110), the observation location (110) comprising a plurality of data sources (112) configured to provide observation data (212); and
   wherein the observation location (110) is configured to one of:
      code the observation data (212) into a coded observation data (212'); and
      provide the observation data (212) to a data aggregator (114) configured to code the observation data (212) into the coded observation data (212');
   wherein the observation data (212) comprises a label array (212a) and an observation data array (212b), the observation data array (212b) including observation values (X1).

2. The weather data system (100) of claim 1, further comprising the data aggregator (114) communicatively coupled to the plurality of data sources (112).

3. The weather data system (100) of claim 1, further comprising a forecasting location (120) communicatively coupled to the observation location (110) and configured to receive the coded observation data (212').

4. The weather data system (100) of claim 3, wherein the forecasting location (120) is communicatively coupled to the observation location (110) via the data aggregator (114).

5. The weather data system (100) of claim 1, wherein the observation data (212) is coded by introducing an adjustment to at least one of the observation values (X1) to obtain the coded observation data (212').

6. The weather data system (100) of claim 5, wherein introducing the adjustment to at least one of the observation values (X1) comprises adding an adjustment value (Q) to the at least one of the observation values (X1) to obtain at least one coded observation value.

7. The weather data system (100) of claim 1, wherein the at least one of the observation location (110) and the data aggregator (114) is further configured to receive a coded forecast and decode the coded forecast to obtain an actual forecast.

8. The weather data system (100) of claim 7, wherein the coded forecast is determined based on the coded observational data (212').

9. The weather data system (100) of claim 8, wherein the coded forecast is comprised of a coded forecast value calculated using forecast value (X2) and a model adjustment (B1).

10. The weather data system (100) of claim 9, wherein the model adjustment (B1) is determined based on an actual model adjustment (B0) added to adjustment value (Q) used to code the observation data (212) into the coded observation data (212').

11. The weather data system (100) of claim 1, wherein the plurality of data sources (112) comprises a sensor, the sensor being one of a radar, temperature sensor, barometer, power sensor, and wind sensor.

12. The weather data system (100) of claim 1, further comprising at least one additional observation location (110') comprising a plurality of additional observation data sources (112').

13. A method of forecasting with coded weather data, the method comprising:
    determining a model adjustment of a forecast model, wherein the model adjustment includes an actual model adjustment and a code; and
    using the forecast model to determine a forecast based on coded observation data including the code;
    wherein the coded observation data comprises a label array and an observation data array, the observation data array including observation values.

14. The method of claim 13, wherein determining the model adjustment of the forecast model is comprised of determining a model adjustment based on a difference between a forecast value and an observational value.

15. The method of claim 14, wherein the model adjustment is further based on an adjustment value (Q).

16. A method of forecasting with coded weather data, the method comprising:
    obtaining observation data from an observation location;
    including an adjustment in one or more values in the observation data to provide coded observation data;
    receiving a coded forecast data determined based on the coded observation data; and
    determining an actual forecast by removing the adjustment from the coded forecast data;
    wherein the observation data comprises a label array and an observation data array, the observation data array including observation values.

17. The method of claim 16, further comprising transmitting the coded observation to a forecast location.

18. The method of claim 16, further comprising using a forecast model to determine the coded forecast data based on the coded observation data.

19. The method of claim 16, further comprising transmitting the coded forecast data to the observation location.

* * * * *